June 5, 1923.
M. M. SYKES
1,457,677
TROLLEY REPLACER
Filed Oct. 26, 1922
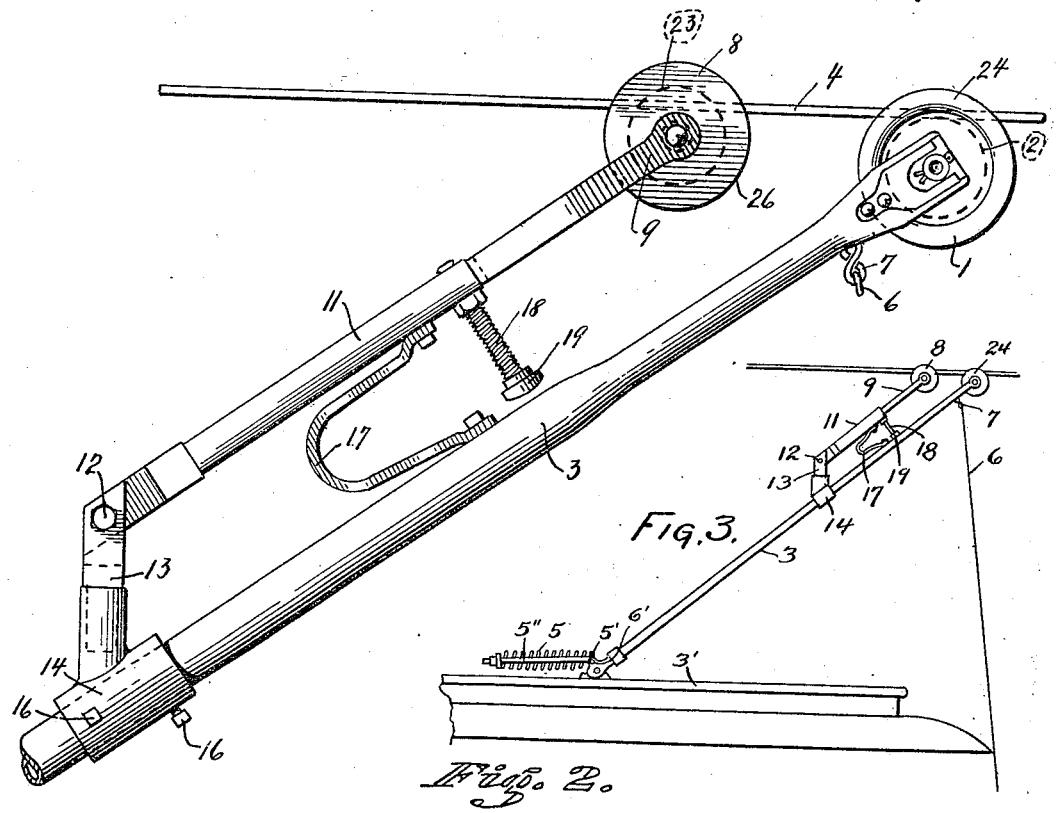
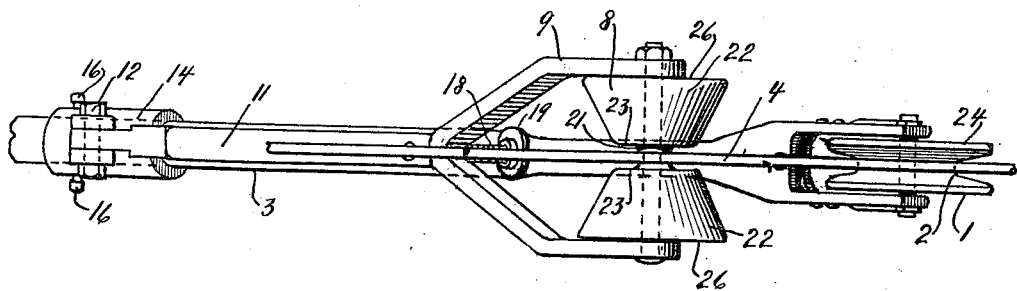
INVENTOR.
M. M. SYKES
BY
ATTORNEYS.

Patented June 5, 1923.

1,457,677

UNITED STATES PATENT OFFICE.

MILES M. SYKES, OF SAN FRANCISCO, CALIFORNIA.

TROLLEY REPLACER.

Application filed October 26, 1922. Serial No. 597,114.

*To all whom it may concern:*

Be it known that I, MILES M. SYKES, a citizen of the United States, and a resident of San Francisco, county of San Francisco, and State of California, have invented a new and useful Trolley Replacer, of which the following is a specification.

The present invention relates to improvements in trolley replacers, and its particular object is to provide a means in connection with the trolley of an electric car for re-engaging the same with the trolley wire in case it becomes disengaged. For this purpose it is proposed to use a second wheel mounted in operative relation to the trolley wheel and adapted to engage the trolley wire whenever the trolley jumps off the same. This second wheel is constructed and disposed in such a manner that it will automatically work the trolley back into its operative position without requiring the attendance of an operator. Further objects and advantages of my invention will appear as the specification proceeds.

The preferred form of my invention is shown in the accompanying drawing in which Figure 1 represents a side elevation of my device. Figure 2 a top plan view of the same and Figure 3 a side elevation of my device as attached to an electric car. While I have shown only the preferred form of the invention it should be understood that various changes or modifications may be made within the scope of the claims hereto attached without departing from the spirit of the invention.

The trolley (1) comprising a narrow wheel provided with a peripheral groove (2) is rotatably supported in the trolley rod (3) extending from an electric car (3'), in a slanting direction, preferably at an angle of about 35 degrees, and is normally held in contact with the overhead wire (4) by means of a strong spring (5) bearing against a stationary member (5') and acting on a yoke (5") pivotally engaging the lower forked end of the rod as at (6'). It frequently happens that especially in passing crossings the trolley jumps off the wire and is thereafter lifted by the spring so as to laterally engage the wire. In the latter case it can be returned to its operative position only with the assistance of an operator who pulls the trolley downwardly by means of a cable (6), engaging the upper end of the rod (3) through the hook (7), and then returns the trolley to the vertical plane of the wire (4) whereupon the trolley spring re-establishes the engagement between the trolley and the wire. My device is designed to render the assistance of the operator unnecessary, and comprises a second wheel (8) supported in the forked end (9) of a second rod (11) pivotally supported as shown at (12) in an arm (13) extending from the rod (3) upwardly in the plane of the latter rod. The arm (13) may be secured to the rod (3) in any suitable manner as by the Y (14) secured on the rod (3) by means of set screws (16). The second rod is held in substantially parallel relation to the first rod by means of a strong spring (17), an adjustable stop (18) threadedly engaging the rod (11) and provided with a head (19) limiting the downward motion of the rod (11) relative to the rod (3).

The wheel (18) is considerably wider than the trolley as shown in Figure 2 and is provided with a deep central groove (21) and broad flaring flanges (22). The two rods are dimensioned and disposed in such a manner that normally when the trolley is engaged with the wire (4) the deep groove (21) does not touch the wire. While in this position the inner lines (23) of the flaring flanges are substantially on a level with the outer periphery of the flanges (24) of the trolley, while the outer lines (26) of the flaring flanges are considerably higher.

The operation of my device is as follows: Normally the trolley (1) is forced into operative contact with the trolley wire by means of the trolley spring (5), and when in this position the wheel (8) does not touch the wire, but the two flaring flanges straddle the same. If, for some reason or other, the trolley (1) jumps off the wire the latter will be immediately engaged by one of the two flaring flanges (22) of the wheel (8). The particular point of engagement is not of importance, and will be governed more or less by the intensity of the cause that made the trolley lose its contact with the wire. Assuming that a central portion of one of the flaring flanges has been engaged, the wheel (8) will then be caused to rotate as the electric car proceeds to travel, due to its own momentum, and the wire will be worked downwardly on the inclined plane so as to force the wheel (8) into a central position relative to the wire. Now the connection between the two rods (3) and (11) is perfectly rigid as far as the vertical plane is concerned, and the trolley has to follow any horizontal motion of the wheel (8). Before the latter wheel allows the wire to enter the deep groove (21) the wire has to pass one of the flanges (24) of the trolley and being disposed at that time at an elevation slightly higher than the top of the trolley flange, it will find no obstruction until it is disposed substantially centrally over the trolley at which time it may slip off the flaring flange into the deep groove of the wheel (8) and engage the bottom of the trolley groove before reaching the bottom of the groove (21) of the wheel (8). Hereby the operative connection between the trolley and the wire has been re-established and the motor of the electric car is supplied with new energy without requiring the assistance of an attendant.

I claim:

1. In a device of the character described, a trolley wire, a trolley adapted to engage the same, a slanting support for the trolley having means associated therewith for forcing the trolley against the wire and a member having flaring flanges thereon formed to engage the wire only when the latter becomes disengaged from the trolley and to re-engage the trolley with the wire.

2. In a device of the character described, a trolley wire, a trolley adapted to engage the same, a support for the trolley having means associated therewith for forcing the trolley against the wire and a wheel supported in the vertical plane of the trolley having flaring flanges thereon formed to engage the wire only when the trolley becomes disengaged from the same and to re-engage the trolley with the wire.

3. In a device of the character described, a trolley wire, a trolley adapted to engage the same, a support for the trolley having means associated therewith for forcing the trolley against the wire, a wheel and means for supporting the same in the vertical plane of the trolley associated with the trolley support, said wheel having flaring flanges thereon formed to engage the wire only when the trolley becomes disengaged from the same and to re-engage the trolley with the wire.

4. In a device of the character described, a trolley wire, a trolley adapted to engage the same, a support for the trolley having means associated therewith for forcing the trolley against the wire, and a wheel supported in the vertical plane of the trolley having a connection with the trolley support adapted to yield in said plane and having flaring flanges thereon formed to engage the wire only when the trolley becomes disengaged from the same and to re-engage the trolley with the wire.

5. In a device of the character described in combination with a trolley having yielding means associated therewith for forcing the same in contact with a trolley wire a trolley replacing wheel supported in operative relation to the trolley having flaring flanges associated therewith formed to engage the wire only when the trolley becomes disengaged and to re-engage the trolley with the wire.

6. In a device of the character described, a trolley wire, a trolley adapted to engage the same, a support for the trolley having means associated therewith for forcing the trolley against the wire, an arm secured to the support in the vertical plane of the trolley, a fork pivoted to the same, spring means for maintaining the fork and the trolley support in substantially parallel relation, and a wheel supported in the end of the fork in operative proximity to the trolley having flaring flanges associated therewith formed to engage the wire when the trolley becomes disengaged and to re-engage the trolley with the wire.

MILES M. SYKES.